United States Patent Office 3,754,001
Patented Aug. 21, 1973

3,754,001
9-IMIDAZOLYL-FLUORENE-9-CARBOXYLIC ACID COMPOUNDS
Helmut Timmler and Karl-Heinz Buchel, Wuppertal-Vohwinkel, and Robert R. Schmidt, Leverkusen-Rheindorf, and Ludwig Eue, Cologne, Germany, assignors to Bayer Aktiengesellschaft, Leverkusen, Germany
No Drawing. Filed Nov. 20, 1970, Ser. No. 91,542
Claims priority, application Germany, Dec. 24, 1969, P 19 64 996.8
Int. Cl. C07d *49/36, 47/18, 55/106*
U.S. Cl. 260—309         11 Claims

ABSTRACT OF THE DISCLOSURE

9-Azolyl-fluorene-9-carboxylic acid compounds e.g., 9-imidazolyl or 9-triazolyl fluorene-9-carboxylic acid compounds which may be additionally substituted, e.g., halogenated, and agriculturally acceptable salts thereof, exhibit outstanding plant growth regulant activity including growth inhibiting, growth promoting and growth altering activity.

---

The present invention relates to certain new 9-azolyl-fluorene-9-carboxylic acid compounds, to plant-growth regulating compositions containing them and to their use for regulating plant growth.

It is known that certain fluorene-9-carboxylic acid derivatives (morphactins) can be used for the regulation of the growth of higher plants (see French patent specifications 1,455,554 and 1,475,350, East German patent specification 34,214 and Austrian patent specification 241,498). In the case of the known compounds (morphactins), particularly at high concentrations, plant damage occurs which, in many cases, can lead to deformation and disfigurement.

The compounds of the invention exhibit strong plant-growth-regulating properties. Surprisingly, the 9-azolyl-fluorene-9-carboxylic acid compounds of this invention exhibit biological properties other than those of certain of the known morphactins. This is shown in that, among other things, the growth-regulating effect is somewhat delayed initially but is substantially longer-lasting than that induced by the most closely related prior art compounds. Particularly striking is the considerably lower injurious effect of the compounds according to the invention on the treated plants in comparison with certain known morphactins.

The compounds of the present invention are 9-azolyl-fluorene-9-carboxylic acid derivatives of the formula

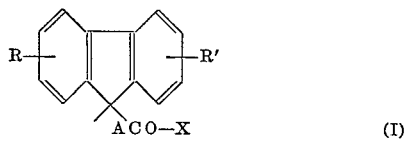

(I)

in which each of R and R', which may be the same or different, are hydrogen, lower alkyl, lower haloalkyl, lower alkoxy or halogen; thus, e.g., R can be hydrogen and R' halogen, or vice-versa. A is an azolyl radical selected from

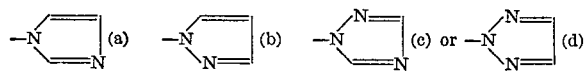

and X is hydroxy, alkoxy (e.g., lower alkoxy, lower alkoxyamino) or the radical

wherein $R''$ is hydrogen or alkyl, e.g., lower alkyl, and
$R'''$ is hydrogen, alkyl, e.g., lower alkyl, or an optionally substituted phenyl radical, and their salts.

As salts of the fluorene-9-carboxylic acid derivatives of the invention, those with acids tolerated by plants are, of course, preferred for the treatment of plants.

Examples of such acids are the halogen hydracids, phosphoric acids, sulfuric acids, aliphatic mono- and dicarboxylic acids as well as hydroxycarboxylic acids.

The present invention also provides a process for the production of the compounds of the present invention in which a 9-halofluorene-9-carboxylic acid derivative of the formula

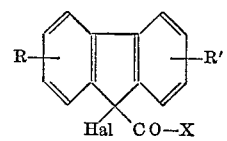

(II)

in which

R, R' and X have the meanings stated above, and
Hal stands for a chlorine or bromine atom, is reacted with an azole selected from imidazole ($a^1$), pyrazole ($b^1$), 1,2,4-triazole ($c^1$) or 1,2,3-triazole ($d^1$) of the respective formulae

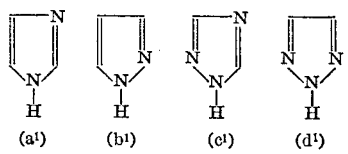

in the presence of an acid-binding agent and optionally in the presence of a diluent (which term herein includes a solvent), and, if required, the resulting 9-azolylfluorene-9-carboxylic acid derivative is converted into a salt thereof.

In Formula II, Hal stands preferably for a chlorine atom.

That a 9-halofluorenecarboxylic acid derivative of the Formula II reacts with an azole such as imidazole (a'), pyrazole (b') or 1,2,4-triazole (c') with the formation of a 9-azolylfluorene-9-carboxylic acid derivative (I) according to the invention could not initially be expected and therefore represents a thoroughly surprising finding. It is known that the halogen atom in a 9-halofluorene-9-carboxylic acid derivative of the Formula II is decidedly slow to react and is not attacked, for example, in the case of several hours' boiling with ammonia solution (see Ann. 389, 237–253 (1912)).

If 9-chlorofluorene-9-carboxylic acid methyl ester and imidazole are used as starting materials, the reaction course can be represented by the following equation:

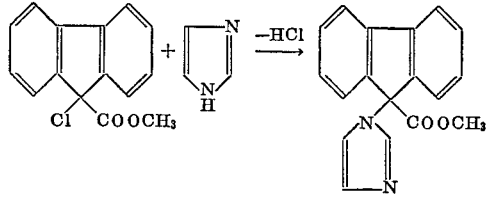

The 9-halofluorene-9-carboxylic acid derivatives to be used as starting materials are defined generally by the Formula II. In this formula, as in Formula I, each of R and R' stands preferably for hydrogen, alkyl with up to 3 carbon atoms, alkoxy with 1 or 2 carbon atoms, chlorine, bromine, fluorine or trifluoromethyl, whilst X stands preferably for methoxy, ethoxy, dimethylamino or diethylamino.

As examples of the 9-halofluorene-9-carboxylic acid derivatives which can be used in the process of the invention, there may be mentioned 9-chloro-fluorene-9-carboxylic acid methyl ester,
9-bromo-fluorene-9-carboxylic acid methyl ester,
9-chloro-fluorene-9-carboxylic acid ethyl ester,
9-chloro-fluorene-9-carboxylic acid isopropyl ester,
9-bromo-fluorene-9-carboxylic acid butyl ester,
2,9-dichloro-fluorene-9-carboxylic acid ethyl ester,
2-chloro-9-bromo-fluorene-9-carboxylic acid methyl ester,
2,7-dichloro-9-bromo-fluorene-9-carboxylic acid methyl ester,
2-methoxy-9-bromo-fluorene-9-carboxylic acid ethyl ester,
2-trifluoromethyl-9-bromo-fluorene-9-carboxylic acid methyl ester,
2-bromo-9-bromo-fluorene-9-carboxylic acid ethyl ester,
2,7-dimethyl-9-bromo-fluorene-9-carboxylic acid methyl ester,
2-methyl-9-chloro-fluorene-9-carboxylic acid methyl ester,
2-methylmercapto-9-bromo-fluorene-9-carboxylic acid ethyl ester.

Only a few of the 9-halofluorene-9-carboxylic acid derivatives used as starting materials are known, for example 9-chlorofluorene-9-carboxylic acid n-butyl ester [see German published specification 1,301,173]. The hitherto unknown compounds can be prepared according to methods which are known in principle, for example from 9-hydroxyfluorene-9-carboxylic acid by means of phosphorus halides, such as phosphorus pentachloride, to give 9-halofluorene-9-carboxylic acid chlorides, with subsequent reaction with alcohols or amines to give the 9-halofluorene-9-carboxylic acid derivatives of the Formula II.

Of the azoles of the formulae (a') to (d'), the readily accessible imidazole (a'), pyrazole (b') and 1,2,4-triazole (c') are preferably used.

The reaction of the 9-halofluorene-9-carboxylic acid derivatives (II) with the azoles can be carried out with or without a diluent. Especially suitable as diluents are poplar organic solvents. These include nitriles, (such as acetonitrile) nitromethane, dimethyl formamide and hexamethyl-phosphoric acid triamide.

As the acid-binding agent, an excess of the azole (a') to (d') may be used. Alternatively, any of the customary acid-binders can be used. These include organic bases such as triethylamine, lutidine and quinoline, but preferred acid-binding agents are alkali metal alcoholates such as sodium methylate or ethylate and inorganic bases such as potassium carbonate, magnesium carbonate or calcium carbonate.

The reaction temperature can be varied within a fairly wide range. In general, the work is carried out at from 0° to 200° C., preferably from 20° to 100° C.

When carrying out the process according to the invention, the azole is expediently used in at least the equivalent amount. If one wishes to dispense with an auxiliary agent for acid-binding purposes, the azole should be used in at least twice the molar (equivalent) amount, but preferably in three times the molar amount. If an auxiliary agent is employed for acid-binding purposes this should be used in at least the equivalent amount, preferably in excess.

Isolation of the reaction products may be carried out in any customary manner, for example by pouring the reaction mixture into water, extraction of the products with an organic solvent, and crystallisation.

The active compounds according to the invention interfere with the physiological phenomena of plant growth and can therefore be used as plant growth regulators.

The different effects of each active compound depend essentially on the point in time of the application, with reference to the development stage of the seed or the plant, as well as on the concentration applied.

Plant growth regulators are used for various purposes which are connected with the development stage of the plant.

Thus, with plant growth regulators the seed domancy can be broked in order to cause the seed to germinate at a certain desired time at which the seed itself shows no readiness to germinate. The seed germination itself can be either inhibited or promoted by such active compounds, depending on the concentration applied. This inhibition or promotion related to the seedling development.

The bud dormancy of the plants, that is to say the endogenic annual cycle, can be influenced by the active compounds, so that for example the plants shoot or blossom at a point in time at which they normally show no readiness to shoot or blossom.

The shoot or root growth can be promoted or inhibited by the active compounds in a manner dependent on the concentration. Thus, it is possible to inhibit very strongly the growth of the fully formed plant, or to bring the plant as a whole to a more robust habitus or the produce a dwarf growth.

A use of the growth regulators which is of economic interest is the suppression or reduction of grass growth at roadsides and waysides. Furthermore, the growth of lawns can be inhibited by growth regulators, so that the frequency of grass-cutting (of lawn-mowing) can be reduced.

During the growth of the plant, the branching to the side can be multiplied by a chemical breaking of the apical dominance. This phenomenon can be very useful in the propagation of plants by cuttings. However, depending on the concentration used, it is also possible to inhibit the growth of side-shoots, for example in order to prevent in tobacco plants the formation of side-shoots after decapitation and thus to promote the leaf growth.

Blossom formation can also be influenced. Thus, depending on the concentration and the point in time of the application, either a retarding or an acceleration of blossom formation can be achieved. In certain circumstances, a multiplication of blossom initiation can be attained when the appropriate treatments are carried out at the time of the normal blossom formation.

The influence of the active compounds on the foliage of the plants can be so regulated that a defoliation is achieved for example in order to facilitate the harvest or to reduce transpiration at a time at which the plants are to be transplanted.

Fruit initiation can be promoted so that more, or seedless, fruits are formed (parthenocarpy). In certain conditions, the premature fall of fruit can also be prevented, or the fruit fall can be promoted up to a certain extent in the sense of a chemical thinning out. The promotion of the fruit fall can, however, also be so exploited that the treatment is effected at the time of the harvest, so as to facilitate harvesting.

The active compounds according to the present invention can be converted into the usual formulations, such as solutions, emulsions, suspensions, powders, pastes and granulates. These may be produced in known manner, for example by mixing the active compounds with extenders, that is, liquid or solid diluents or carriers, optionally with the use of surface-active agents, that is, emulsifying agents and/or dispersing agents. In the case of the use of water as an extender, organic solvents can for example, also be used as auxiliary solvents.

As liquid diluents or carriers, there are preferably used aromatic hydrocarbons, such as xylenes or benzene, chlorinated aromatic hydrocarbons, such as chlorobenzenes paraffins, such as mineral oil fractions, alcohols, such as methanol or butanol, or strongly polar solvents, such as dimethyl formamide or dimethyl sulphoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates and aryl sulphonates; and preferred examples of dispersing agents include lignin, sulphite waste liquors and methyl cellulose.

The formulations contain, in general, from 0.1 to 95, preferably from 0.5 to 90, percent by weight of active compound.

The active compounds may be applied as such or in the form of their formulations or of the application forms prepared therefrom, such as ready-to-use solutions, emulsifiable concentrates, emulsions, suspensions, spray powders, pastes, soluble powders, dusting agents and granulates. Application may take place in any usual manner, for example by watering, squirting, spraying, scattering or dusting.

The concentrations of active compound can be varied within a fairly wide range for actual application. In general, concentrations of 0.0005 to 2%, preferably of 0.01 to 0.5%, are used.

Further, there are applied, in general, 0.1 to 100 kg., preferably 1 to 10 kg., of active compound per hectare of soil area.

For the application time, it is usually valid to say that application is most favourable when a strong elongation growth has occurred, that is at the so-called "time of greatest shooting." In ligneous plants, application is usually preferred shortly before commencement of shooting. This, in contrast to the application of insecticides and fungicides, the application of the growth regulators is effected in a preferred space of time, the precise delimitation of which is governed by the climatic and vegetative circumstances.

The present invention also provides a plant-growth-regulating composition containing as active ingredient a compound of the present invention in admixture with a solid diluent or carrier or in admixture with an liquid diluent or carrier containing a surface-active agent.

The present invention also provides a method of controlling the growth of plants which comprises applying to the plants or seeds thereof a compound of the present invention alone or in the form of a composition containing as active ingredient a liquid diluent or carrier.

The activity of the substances to be used according to the invention is illustrated in the following test examples.

| Compound No. | Chemical name | Structure |
| --- | --- | --- |
| 1 | 9-imidazolyl-(1)-fluorene-9-carboxylic acid methyl ester. | |
| 2 | 9-imidazolyl-(1)-fluorene-9-carboxylic acid n-propyl ester. | |
| 3 | 9-imidazolyl-(1)-fluorene-9-carboxylic acid isopropyl ester. | |
| 4 | 9-[1,2,4-triazolyl-(1)]fluorene-9-carboxylic acid isopropyl ester. | |
| 5 | 9-imidazolyl-(1)-fluorene-9-carboxylic acid methyl ester hydrochloride. | |
| 6 | 9-[1,2,4-triazolyl-(1)]fluorine-9-carboxylic acid ethyl ester. | |
| 7 | 2-chloro-9-imidazolyl-(1)-fluorene-9-carboxylic acid methyl ester. | |
| 8 | 9-imidazolyl-(1)-fluorene-9-carboxylic acid ethyl ester. | |

EXAMPLE A

Growth inhibition/linseed test

Solvent: 40 parts by weight acetone
Emulsifier: 0.25 part by weight alkyl aryl polyglycol ether To produce a suitable preparation of active compound, 1 part by weight of active compound is mixed with the stated amount of solvent which contains the stated amount of emulsifier, and the concentrate is diluted with a disodium hydrogen phosphate-potassium dihydrogen phosphate buffer solution (pH 6) to the desired concentration.

Batches of 25 linseeds are laid out on two filter papers in a Petri dish. 10 ml. of the preparation of active compound are pipetted into each dish. Germination of the seeds takes place in the dark at 25° C.

After 3 days, the length of the roots and of the shoot is determined and the growth inhibition compared with the control plant is expressed as a percentage. 100% denotes the standstill of growth, and 0% denotes a growth corresponding to that of the untreated plant.

The active compounds, the concentrations of the active compounds in p.p.m. (=mg./kg.) and results can be seen from the following table.

TABLE A.—GROWTH INHIBITION/LINSEED TEST

| Active compound | Concentration, p.p.m. | Percent inhibition | |
|---|---|---|---|
| | | Root | Shoot |
| Water (control) | 0 | 0 | 0 |
| 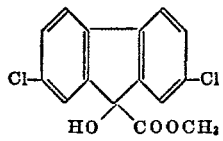 (known) | 50 | 20 | 37 |
| | 250 | 90 | 90 |
| Compound: | | | |
| 1 | 50 | 35 | 85 |
| | 250 | 98 | 100 |
| 2 | 50 | 85 | 95 |
| | 250 | 94 | 97 |
| 3 | 50 | 95 | 95 |
| | 250 | 98 | 98 |
| 4 | 50 | 82 | 90 |
| | 250 | 100 | 100 |
| 5 | 50 | 100 | 100 |
| | 250 | 100 | 100 |
| 6 | 50 | 85 | 85 |
| | 250 | 95 | 95 |

EXAMPLE B

Growth inhibition/oat grains

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the concentrate is diluted with a disodium hydrogen phosphate-potassium dihydrogen phosphate buffer solution (pH 6) to the desired concentration.

Batches of 25 oat grains are laid out on two filter papers in a Petri dish. 10 ml. of the preparation of active compound are pipetted into each dish. Germination of the seeds takes place in the dark at 25° C.

After 3 days, the length of the shoot and the roots is determined and the growth inhibition compared with the control plant is expressed as a percentage. 100% denotes the standstill of growth, and 0% denotes a growth corresponding to that of the untreated plant.

The active compounds, concentrations of the active compounds in p.p.m. (=mg./kg.) and the results can be seen from the following table.

TABLE B.—GROWTH INHIBITION/OAT GRAINS

| Active compound | Concentration, p.p.m. | Percent inhibition | |
|---|---|---|---|
| | | Root | Shoot |
| Water (control) | 0 | 0 | 0 |
| 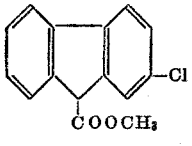 (known) | 50 | 16 | 45 |
| | 250 | 25 | 50 |
| Compound: | | | |
| 7 | 50 | 95 | 97 |
| | 250 | 100 | 100 |
| 1 | 50 | 90 | 66 |
| | 250 | 99 | 83 |
| 3 | 50 | 79 | 72 |
| | 250 | 80 | 78 |
| 2 | 50 | 66 | 46 |
| | 250 | 75 | 94 |
| 4 | 50 | 71 | 70 |
| | 250 | 85 | 78 |
| 5 | 50 | 100 | 100 |
| | 250 | 100 | 100 |
| 6 | 50 | 75 | 80 |
| | 250 | 81 | 92 |

EXAMPLE C

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the concentrate is diluted with a disodium hydrogen phosphate-potassium dihydrogen phosphate buffer solution (pH 6) to the desired concentration.

Apple seedlings are, at a height of about 2 cm., sprayed with a preparation which contains 500 p.p.m. of active compound.

After 7 days, the percentage inhibition of the treated plants compared with the untreated control plant is determined. With 100% inhibition, no growth is present; with 0% inhibition, the growth corresponds to that of the control plant.

Also after 7 days, the degree of damage to the plants is determined and characterised by the values 0–5, which have the following meaning:

0: no effect
1: a few slightly burnt spots
2: marked damage to leaves
3: some leaves and parts of stalks partially dead
4: plant partially destroyed
5: plant completely dead.

The active compounds, the amounts applied and the results can be seen from the following table.

TABLE C.—GROWTH INHIBITION/APPLE SEEDLINGS

| Active compound | Percent inhibition | Damage |
|---|---|---|
| Water (control) | 0 | 0 |
| 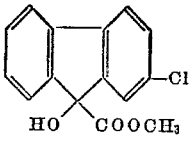 (known) | 57 | 3–4 |
| Compound: | | |
| 3 | 57 | 1 |
| 4 | 57 | 2 |

EXAMPLE D

Growth inhibition/tomato plants

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the concentrate is diluted with a disodium hydrogen phosphate-potassium dihydrogen phosphate buffer solution (pH 6) to the desired concentration.

Tomato plants of a height of 10 cm. are sprayed with a preparation which contains 500 p.p.m. of active compound.

After 8 days, the percentage inhibition of the treated plants compared with the untreated control plant is determined. With 100% inhibition, no growth is present; with 0% inhibition, the growth corresponds to that of the control plant.

Also after 8 days, the degree of damage to the plants is determined and characterised by the values 0–5, which have the following meaning:

0: no effect
1: a few slightly burnt spots
2: marked damage to leaves
3: some leaves and parts of stalks partially dead
4: plant partially destroyed
5: plant completely dead.

The active compounds, the amount applied and the results can be seen from the following table:

TABLE D.—GROWTH INHIBITION/TOMATOES

| Active compound | Percent Inhibition | Damage |
|---|---|---|
| Water (control) | 0 | 0 |
| 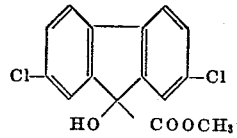 (known) | 40 | 4 |
| Compound: | | |
| 1 | 42 | 2-3 |
| 8 | 40 | 2 |
| 3 | 45 | 3 |
| 2 | 55 | 2 |
| 4 | 48 | 2-3 |
| 6 | 40 | 2-3 |

EXAMPLE E

Growth inhibition/bean plants

Solvent: 40 parts by weight acetone
Emulsifier: 0.25 part by weight alkylaryl polyglycol ether To produce a suitable preparation of active compound, 1 part by weight of active compound is mixed with the stated amount of solvent which contains the stated amount of emulsifier, and the concentrate is diluted with a disodium hydrogen phosphate-potassium dihydrogen phosphate buffer solution (pH 6) to the desired concentration.

Bean plants of a height of 10 cm. are sprayed with a preparation which contains 500 p.p.m. of active compound.

After 8 days, the percentage inhibition of the treated plants compared with the untreated control plant is determined. With 100% inhibition, no growth is present; with 0% inhibition, the growth corresponds to that of the control plant.

Also after 8 days, the degree of damage to the plants is determined and characterised by the values 0-5, which have the following meaning:

0: no effect
1: a few slightly burnt spots
2: marked damage to leaves
3: some leaves and parts of stalks partially dead
4: plant partially destroyed
5: plant completely dead.

The active compounds, the amounts applied and the results can be seen from the following table:

TABLE E.—GROWTH INHIBITION/BEANS

| Active compound | Percent Inhibition | Damage |
|---|---|---|
| Water (control) | 0 | 0 |
| 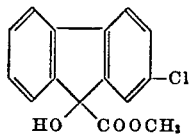 (known) | 45 | 4 |
| Compound: | | |
| 7 | 45 | 2-3 |
| 3 | 45 | 2-3 |
| 2 | 45 | 2 |
| 6 | 45 | 2-3 |

The following examples illustrate the preparative process according to the invention.

EXAMPLE 1.—PREPARATION OF COMPOUND 1

26 g. (0.1 mole) 9-chlorofluorene-9-carboxylic acid methyl ester were boiled for 12 hours with stirring and under reflux with 20 g. (0.3 mole) imidazole in 200 cc. acetonitrile. After distilling off the acetonitrile, the residue was treated with water and the reaction product was taken up in benzene. After drying of the benzene solution with sodium sulphate, the benzene in drawn off in a vacuum and the residue was triturated with ligroin until crystallisation occurs.

Yield: 15 g. 9-imidazolyl-(1)-fluorene-9-carboxylic acid methyl ester (67% of the theory); M.P.: 150° C.

The 9-chlorofluorene-9-carboxylic acid methyl ester can be prepared as follows:

27 cc. thionyl chloride were added dropwise to a solution of 65 g. (0.27 mole) 9-hydroxyfluorene-9-carboxylic acid methyl ester in 500 cc. methylene chloride. The reaction mixture was subsequently stirred for 2 hours at room temperature and then boiled under reflux until the evolution of gas ceases. After cooling, the methylene chloride layer was separated, washed with aqueous sodium bicarbonate solution, and the methylene chloride was evaporated. The residue crystallized.

Yield: 53 g. (71% of the theory) 9-chlorofluorene-9-carboxylic acid methyl ester of the melting point 112° C.

EXAMPLE 2.—PREPARATION OF COMPOUND 8

In a manner analogous to that of Example 1, there was obtained 9-imidazolyl-(1)-fluorene-9-carboxylic acid ethyl ester from 9-chlorofluorene-9-carboxylic acid ethyl ester and imidazole. The yield was 61% of the theory; M.P.: 131° C.

EXAMPLE 3.—PREPARATION OF COMPOUND 7

13.4 g. (0.2 mole) imidazole were added to a solution of sodium ethylate which was prepared from 4.6 g. (0.2 mole) sodium in 250 cc. ethanol. The ethanol was distilled off in a vacuum and the residue was dissolved in 500 cc. acetonitrile. After the addition of 50.6 g. (0.17 mole) 2-chloro-9-fluorene-9-carboxylic acid methyl ester, boiling was effected for 24 hours, with stirring and under reflux. The solvent was then evaporated in a vacuum. The residue was treated with water and the reaction product was taken up in ethyl acetate. The residue remaining after evaporation of the solvent was recrystallized from ethyl acetate/petroleum ether. Yield: 11 g. (20% of the theory).

In an analogous manner, the following new 9-azolyl-fluorene-9-carboxylic acid derivatives of the Formula I can be prepared:

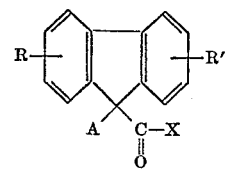

| Example | R | R' | X | A | Melting point (° C.) |
|---|---|---|---|---|---|
| 4 | H | H | OC₂H₅ | 1-imidazolyl | 131 |
| 5 | H | H | OC₃H₇-n | 1-imidazolyl | 85 |
| 6 | H | H | OCH₃ | 1-(1,2,4-triazolyl) | 140-145 |
| 7 | H | H | OCH(CH₃)₂ | 1-imidazolyl | 146 |
| 8 | H | H | OCH(CH₃)₂ | 1-(1,2,4-triazolyl) | 156 |
| 9 | H | H | OCH₃ | 1-imidazolyl (hydrochloride) | 175 |
| 10 | H | H | OC₂H₅ | 1-(1,2,4-triazolyl) | 133 |
| 11 | H | H | OC₄H₉-n | 1-imidazolyl (hydrochloride) | 158 |
| 12 | 2-Cl | H | OCH₃ | 1-(1,2,4-triazolyl) | 160 |

It will be understood that the specification and examples are illustrative but not limitative of the present invention and that other embodiments within the spirit and scope of the invention will suggest themselves to those skilled in the art.

What is claimed is:

1. 9-azolyl-fluorene-9-carboxylic acid compound of the formula

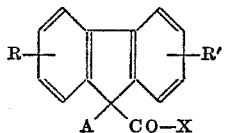

in which
each of R and R', which may be the same or different, are hydrogen or halogen; and wherein A is imidazolyl-1; and
X is lower alkoxy, or agriculturally acceptable salts of said compound.

2. Compound as claimed in claim 1, wherein one of R and R' is hydrogen and the other is halogen.

3. Compound as claimed in claim 1 wherein X is alkoxy of up to 4 carbon atoms.

4. Compound as claimed in claim 2 wherein X is methoxy or ethoxy.

5. Compound as claimed in claim 1 wherein said compound is designated as 9-imidazolyl-(1)-fluorene-9-carboxylic acid methyl ester.

6. Compound as claimed in claim 1 wherein said compound is designated as 9-imidazolyl-(1)-fluorene-9-carboxylic acid n-propyl ester.

7. Compound as claimed in claim 1 wherein said compound is designated as 9-imidazolyl-(1)-fluorene-9-carboxylic acid isopropyl ester.

8. Compound as claimed in claim 1 wherein said compound is designated as 9-imidazolyl-(1)-fluorene-9-carboxylic acid methyl ester hydrochloride.

9. Compound as claimed in claim 1 wherein said compound is designated as 2-chloro-9-imidazolyl-(1)-fluorene-9-carboxylic acid methyl ester.

10. Compound as claimed in claim 1 wherein said compound is designated as 9-imidazolyl-(1)-fluorene-9-carboxylic acid ethyl ester.

11. Compound as claimed in claim 1 designated 9-imidazolyl-(1)-fluorene-9-carboxylic acid n-butyl ester.

References Cited
UNITED STATES PATENTS 3,530,183   9/1970   Kyburz et al. _____ 260—309.6

OTHER REFERENCES

Davis et al., Chem. Abst., vol. 61, columns 5586–7 (1964).
Draper et al., Chem. Abst., vol. 73, No. 45510q (1970).
Fournari et al., Chem. Abst., vol. 69, No. 106622u (1968).
McCown et al., J. Amer. Chem. Soc., vol. 64, pages 689–90 (1942).
Mizzoni, Chem. Abst., vol. 67, No. 21736t (1967).
Gualtieri et al., Chem. Abst., vol. 58, columns 4553–4 (1963).
Schlenk et al., Liebigs Annal. Chem., vol. 463, pages 292–3 (1928).
Staab et al., Chem. Abst., vol. 65, columns 12, 194–5 (1966).

NATALIE TROUSOF, Primary Examiner

U.S. Cl. X.R.

71—92; 260—308 R, 308 A, 310 R, 469, 470, 473 F

UNITED STATES PATENT OFFICE
CERTIFICATE OF CORRECTION

Patent No. 3,754,001          Dated August 21, 1973

Inventor(s) Helmut Timmler et al.

It is certified that error appears in the above-identified patent and that said Letters Patent are hereby corrected as shown below:

Col. 1, line 56

For 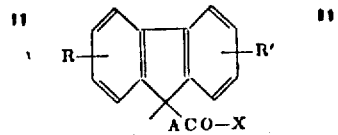

Read 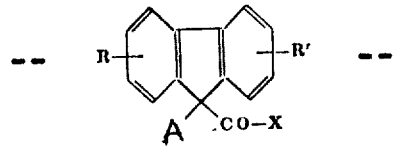

Col. 4, line 6

For                " domancy"

Read               -- dormancy --

Signed and sealed this 25th day of June 1974.

(SEAL)
Attest:

EDWARD M. FLETCHER, JR.          C. MARSHALL DANN
Attesting Officer                Commissioner of Patents